Jan. 12, 1971 W. L. HATTON 3,555,427

DIGITAL DIVERSITY RECEPTION SYSTEM

Filed Feb. 1, 1968 3 Sheets-Sheet 1

INVENTOR
WILLIAM L. HATTON
BY Irving S. Rappaport
ATTORNEY

INVENTOR
WILLIAM L. HATTON
BY Irving S. Rappaport
ATTORNEY

Jan. 12, 1971 W. L. HATTON 3,555,427

DIGITAL DIVERSITY RECEPTION SYSTEM

Filed Feb. 1, 1968 3 Sheets-Sheet 3

INVENTOR
WILLIAM L. HATTON
BY Irving S. Rappaport
ATTORNEY

United States Patent Office 3,555,427
Patented Jan. 12, 1971

3,555,427
DIGITAL DIVERSITY RECEPTION SYSTEM

William L. Hatton, Wellesley, Mass., assignor to Raytheon Company, Lexington, Mass., a corporation of Delaware Filed Feb. 1, 1968, Ser. No. 702,376
Int. Cl. H04b *7/08, 1/06*
U.S. Cl. 325—306 5 Claims

ABSTRACT OF THE DISCLOSURE

A digital diversity reception system utilizing digital logic circuitry for combining the incoming digital signals and employing timing recovery circuits to control the digital signal combining.

BACKGROUND OF THE INVENTION

Because almost all troposcatter communications work has used frequency division multiplex systems (FDM), the diversity reception combiners developed have been designed for optimization of performance with FDM systems. However, PCM systems whether line-of-sight or troposcatter carry digital traffic. Prior art diversity systems which operate on the basis of noise detection are paralyzed by the PCM signal, because the signal fills the entire bandwidth of the receiver. The prior art systems also have been primarily designed to carry frequency division multiplex signals as opposed to digital traffic. The systems which utilize carrier signal strength suffer from the disadvantage of the slowness in reaction time and are not capable of indicating waveform distortion which often arises from multipath distortion. If the design of a PCM system is efficient, it is difficult for the receiver, which contains only RF and baseband circuitry, to determine whether the receiver output is satisfactory. This difficulty in determining a satisfactory receiver output is due to the fact that the minimum bandwidth transmission of digital traffic occupies the entire RF and video bands. This fact makes the use of a pilot tone such as is used in frequency division multiplex systems very difficult. In addition, in a PCM system the minimum useable video signal-to-noise ratio is so low that only a regenerator can accurately distinguish the signal from the noise.

In a digital diversity reception system, the way of making the most critical judgments is the timing recovery because this timing recovery allows one to determine the most satisfactory signal—the one which yields the best timing. The advantages and features of the present invention have been arrived at by arbitrarily dividing the digital diversity problem into two phases—digital signal combining and digital combining control. In the present invention the digital signal combining is accomplished utilizing digital logic circuits and the combining control is derived from timing recovery circuits.

The logic combining has the advantage of simplicity and minimum mutilization of the signal. It is fast enough to allow switching in less than one bit, and there is no possibility of a disturbance extending over several bits, either because of pulse crosstalk (this is quite severe in biternary transmission) or circuit transient response. Most transfers will be accomplished without mutilating a single bit, and the maximum damage can be only one bit. If this occasional mutilating of one bit appears to contribute significantly to the total system performance, a slightly more complicated logic can be utilized which permits switching only during PCM transition times.

Deriving the control for the switching from the timing offers some important advantages over other systems.

Comparing the timing-derived control to other baseband systems, the timing-derived system has the advantage of easy measurement of baseband signal-to-noise ratio. This is difficult by ordinary means in a PCM system because PCM systems are usually minimum-bandwidth systems, and the PCM signal spectrum occupies the entire band. This means that there is no place in the spectrum where the radio noise is not blanketed by PCM noise. If the bandwidth is widened to provide such a clear spot, the system either pays a price in range or suffers from the variability of radio characteristics at the edge of the band.

Comparing the timing-derived control to IF combining, the timing-derived control is simpler in the overall system, since timing must be derived in any case for use in the PCM regenerator and/or multiplexer. Furthermore, it is not vulnerable to short-term variations in the spectrum and locking-in transients as are phase-locked oscillators and other carrier extraction schemes.

SUMMARY OF THE INVENTION

The above advantages and features of the present invention are achieved by providing a digital diversity reception system comprising a plurality of channels for receiving digital input signals, each channel including an antenna, a receiver and a demodulator, the output from each demodulator being a baseband signal, a plurality of timing recovering means to which a respective baseband output is applied for extracting the timing signals from each of the digital input signals; means for comparing the timing amplitude of each of said timing signals; means for selecting the timing signal having the highest timing amplitude; means for preventing any portion of any timing signal from being lost as the timing signal having the highest timing amplitude is selected; a plurality of regenerating means for regenerating each of the digital input signals; and means for providing the desired digital output signal and the timing output signal.

DESCRIPTION OF THE PREFERRED EMBODIMENTS

Figure 1:
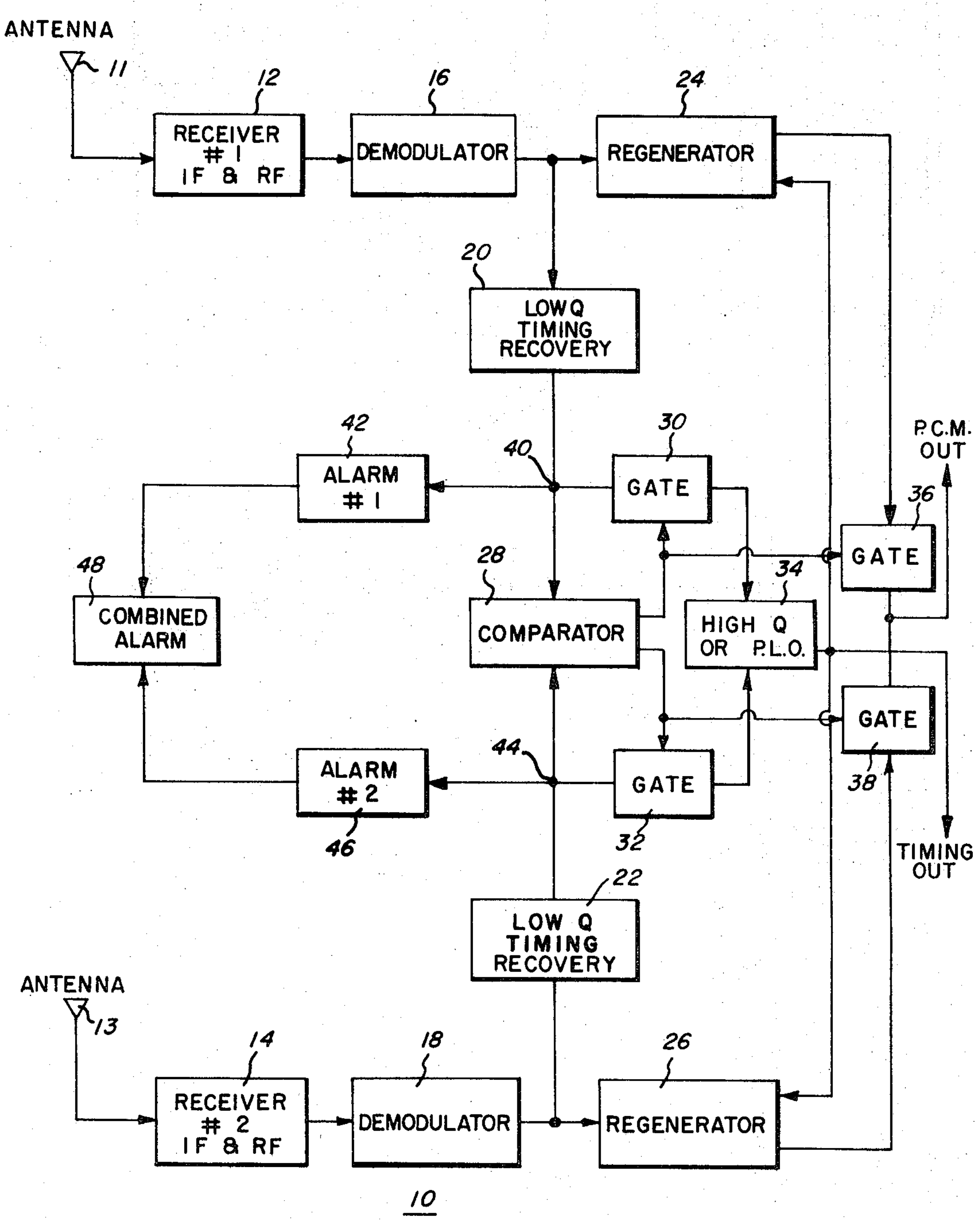
FIG. 1 is a block diagram of the preferred embodiment of the present invention.

In the several views like numbers refer to like or similar parts. FIG. 1 shows a digital diversity reception system 10 embodying the present invention. This system 10 requires two separate outputs—a regenerated PCM signal and a timing signal. Although timing signals are contained within the input digital signals, in order to provide a separate timing signal at the output of the system 10, there must be a recovery of these timing signals. In order to derive timing signals from the incoming unregenerated PCM signal, the incoming waveform must be clipped about the center, differentiated, rectified and filtered. The signal at the input of the filter consists of pulses that occur at the zero crossing of the input wave. The output of the filter is a sine wave whose phase is related to the zero crossing times.

The sine wave is not a pure sine wave because it contains both AM and FM due to the video noise and variations in the pattern. In addition, its average amplitude depends on the amount of video noise. This is because the noise causes displacements in the zero crossings and a displaced pulse at the input to the filter does not contribute as much to the output amplitude as a normal pulse. It has been shown that the timing signal power is given by:

$$S^2=4A^2f^2P^2e^{-2\pi^2\sigma_2 M^2 f^2} \quad (1)$$

where A is the area of the filter input pulse, $f$ is the bit rate, P is the transition probability, M is the order of the harmonic of the bit rate extracted (usually $=1$), and $\sigma_2$ is given by:

$$\sigma_2=\sqrt{2}\,\frac{1}{S}\,\frac{\sigma}{V} \quad (2)$$

V=the RMS noise to peak signal ratio, and S is the slope of the zero crossings. Because of M in Equation 1 above, the threshold can be shifted by setting the timing filter frequency to the second harmonic.

Use is made of this property by taking the two video outputs of two receivers and extracting timing from each. The timing amplitudes are compared and the highest timing amplitude corresponds to the best signal. It is true that the timing amplitude varies as a function of the pattern (note that the transition probability P appears in the equation), but in a troposcatter system the pattern variation is common to both receivers, and the selection depends only on the quality of the signal. Furthermore, if a strong signal is distorted by multipath so that the zero crossings are displaced, a very marked loss of timing amplitude occurs. Thus, the system discriminates against distorted signals.

Not only is the PCM chosen from the best received signal, but the timing wave used for the multiplexer or control of the next hop through the PCM combiners is also selected from the best signal. Therefore, the best output of the two filters is selected after the comparison has been made. It is essential that in switching the timing from one receiver to another that not one timing pulse be lost or added. Therefore, an additional common filter is used to provide a flywheel effect. This additional filter has slower response time than the first two filters and, in fact, may be a phase locked oscillator. FIG. 1 shows a block diagram of such a system. In addition to the selection feature, a detector has been provided that operates when neither signal is good enough to be used. Individual alarms for equipment failure are connected to the individual timing recovery circuits.

More specifically, the system 10 shown in FIG. 1 includes a pair of receivers 12 and 14 connected to their respective receiving antennas 11 and 13 for receiving the incoming unregenerated PCM signal. Receivers 12 and 14 include both the IF and RF portions of the receivers. The signals from the receivers 12 and 14 are applied to demodulators 16 and 18 respectively. The outputs from the demodulators 16 and 18 represent baseband output signals which are applied to low Q timing recovery circuits 20 and 22 respectively. In addition, the baseband outputs from the demodulators 16 and 18 are applied to regenerators 24 and 26 respectively. Low Q timing recovery circuits 20 and 22 give poor timing signals but are very critical in the operation of the present system. The signal output of the low Q circuits 20 and 22 are poor quality, high noise type sine waves. These amplitudes of these sine waves are the most critical factors in determining signal quality. The amplitudes of these timing signals drop as the carrier-to-noise ratio reaches threshold value and are also lowered as a result of multipath distortion, which must be discriminated against.

The Q of the timing recovery circuits 20 and 22 are dtermined by weighing the following factors: The lower the Q the faster the response. This characteristic is desirable since an outage should be detected as quickly as possible in order to reduce the length of bad traffic in this system and to decrease the duration of poor timing signals. Since low Q circuits have considerable amplitude modulation due to short time pattern fluctuations and true outages. Finally, if the radio receiver has no squelch in itself, or the squelch is too slow acting, the timing recovery circuits 20 and 22 will be filled with noise. A low Q filter has more output from random noise than a high Q filter. These considerations are taken into account in determining the value of the Q for the timing recovery circuits 20 and 22. The low Q timing recovery circuits are quite fast. For bit rates in the order of megabits per second, the filter bandwidth may be in the order of kilocycles per second. This relationship permits detection of the timing signals in fractions of a millisecond. Filter Q's for the low Q timing recovery circuits 20 and 22 may range 200 upward.

The signals out of the timing recovery circuits 20 and 22 are applied to a comparator 28 in order to determine which of the two poor quality, high noise type sine waves has the higher amplitude. After the comparator 28 has determined which of the two outputs from the timing recovery circuits 20 and 22 is better, a good timing signal must be generated. In order to generate good timing signals, dual gating circuits 30 and 32 are connected to the outputs of the comparator 28. Gating circuits 30 and 32 select the better of the two signals compared by comparator 28. One output signal at a time from the gating circuits 30 and 32 is applied to a circuit 34 which may be a high Q filter or a phase locked oscillator (PLO). The output from the circuit 34 is a good timing signal which represents the better of the two received incoming signals and satisfies the requirements for the regenerators 24 and 26 as well as the output equipment which is driven by the regenerated PCM output signal.

The timing signal provided by circuit 34 is also applied to each of the regenerators 24 and 26 which act to regenerate the incoming PCM signals. Any efficient type regenerator which may be used such as sampling, matched filters or spread spectrum must recover timing from the signal. In the present invention channel selection is accomplished by using the recovered timing wave amplitude as the measured parameter. The outputs from each of the regenerators 24 and 26 are applied to gating circuits 36 and 38 respectively. In addition, the outputs from the comparator 28 are also applied to the gating circuits 36 and 38. The gating circuits 36 and 38 select the output from the respective regenerator which is associated with the best incoming signal. The outputs from the gating circuits 36 and 38 yield the desired regenerated PCM output signal representing the best incoming signal.

In addition to providing the required regenerated PCM output signal and the required timing output signal, system 10 also has the capabilities of indicating its own status with respect to outages. The possible states include the following: both channels operating, only one channel operating and both channels not operating. In order to provide this status indication system 10 is provided with an alarm network. The alarm network may comprise a pen recorder system in order to provide complete status information, a system of bells or lights, or even special outputs on the PCM output line for remote applications in order to indicate that both channels are out. Connected to the junction 40 between the gating circuit 30 and the timing recovery circuit 20 is an alarm 42 which gives independent status information about the channel including receiver 12. As stated above, alarm 42 may be a pen recording system, a bell alarm, a light alarm or some other status indicating mechanism. Connected to the junction 44 between the gating circuit 32 and the timing recovery circuit 22 is an alarm 46 which gives independent status information about the channel including receiver 14. As stated above, alarm 46 may be a pen recording system bell alarm, a light alarm or some other status indicating mechanisms. When both alarms 42 and 46 are activated, a combined alarm 48 is activated. When both alarms 42 and 46 are activated this represents the most serious condition for the system since both channels are out and the entire system is inoperative. Outages may occur due to transmission failure or when the incoming signals are below an acceptable level.

If one of the signals fades or otherwise degrades, the system unerringly selects the better of the two without causing any system disturbance or errors much in excess of what can be expected from the noise present in the better signal. If an outage on both signals occurs simultaneously, the system does not extend the outage appreciably.

The system in FIG. 1 is capable of accepting an interruption in the signals due to the operation of the gating circuits 30 and 32. If gating circuits 30 and 32 miss a pulse, the output of the circuit 34 is not affected since the high Q filter or phase locked oscillator supplies this missing pulse in order to obtain a continuous output. Therefore, in the embodiment of FIG. 1, the switching occurs first and then the signals are applied to the circuit 34 for the high Q filtering.

Figure 2:
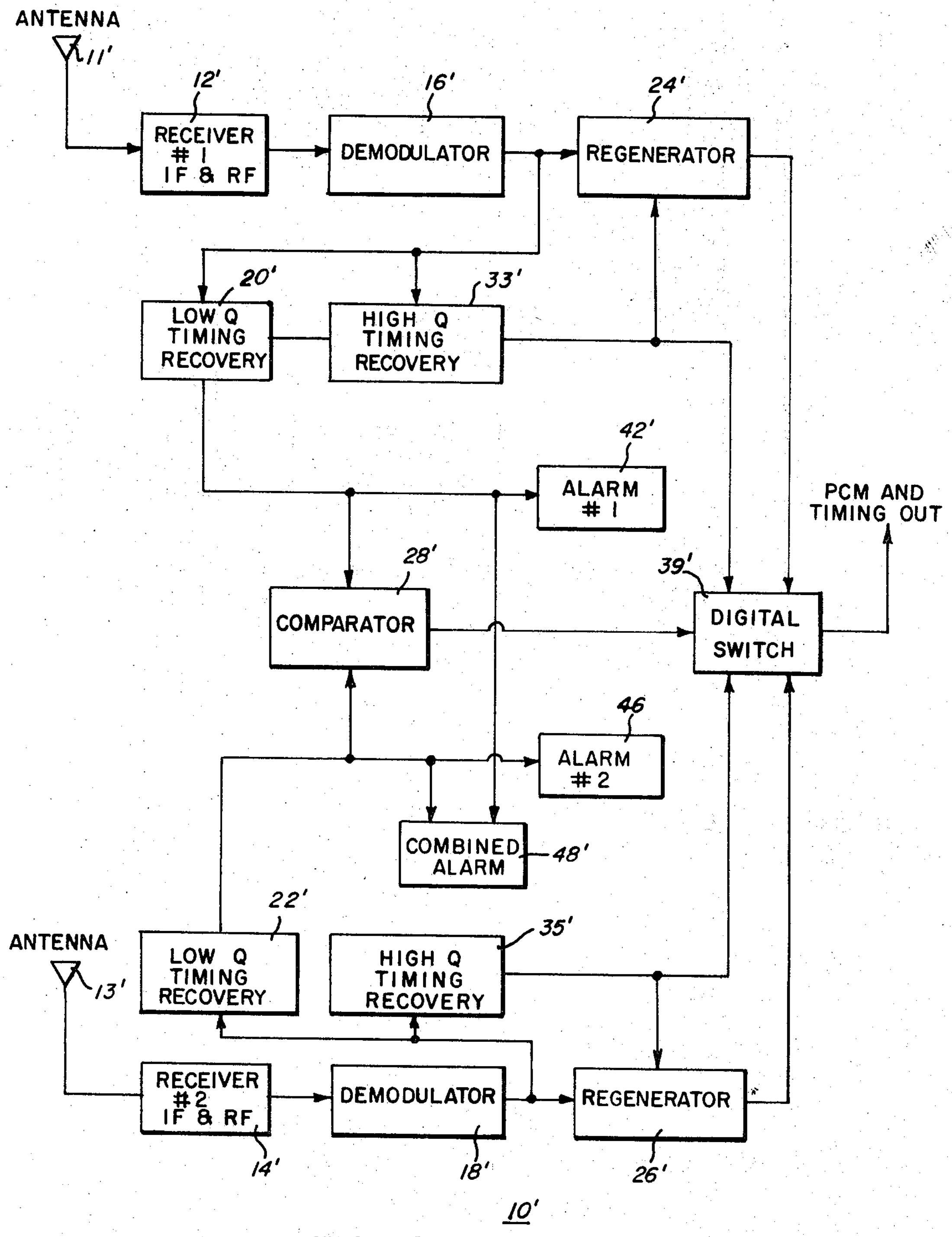
FIG. 2 is an alternative embodiment of the present invention.

FIG. 2 shows an alternative embodiment of the present invention in which the incoming baseband signals from the demodulators 16' and 18' are simultaneously applied to the low Q timing recovery circuits 20' and 22' respectively and to high Q timing recovery circuits 33' and 35' respectively. The outputs from the high Q timing recovery circuits 33' and 35' are applied to a digital switching circuit 39'. The outputs from the regenerators 24' and 26' and the output from the comparator 28' are also applied to the digital switch circuit 39'. The output from the digital switching circuit 39' includes both the regenerated PCM output signal and the timing signal output. The only difference between the embodiments of FIGS. 1 and 2 is that in FIG. 1 the digital switching is accomplished by gating circuits 30 and 32 and then applied to the high Q timing recovery circuit 34 while in FIG. 2 the signals first are applied to the high Q timing recovery circuits 33' and 35' and then the digital switching takes place in digital switching circuit 39'.

Figure 3:
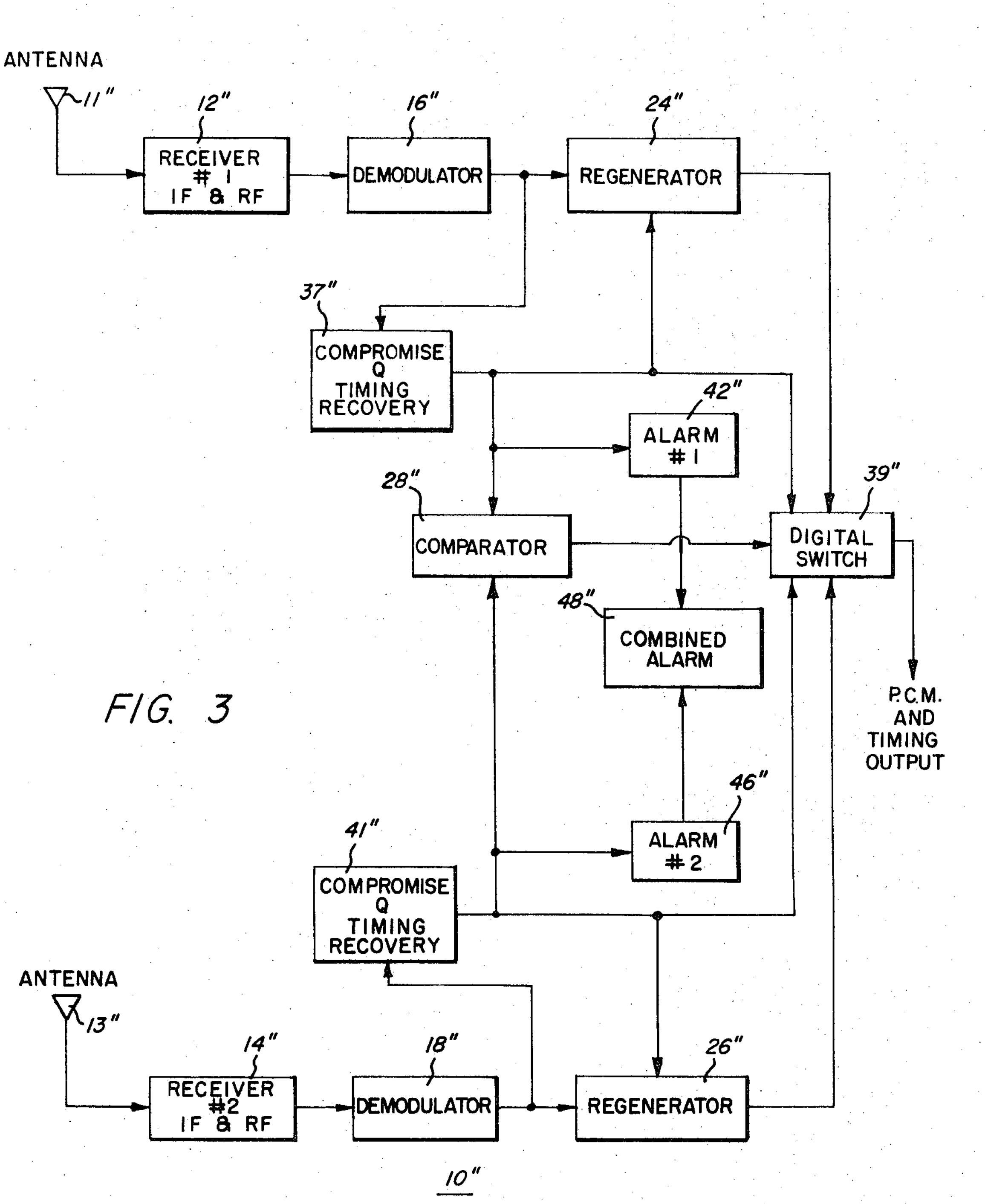
FIG. 3 is another alternative embodiment of the present invention.

Another alternative embodiment of the system is shown in FIG. 3. The embodiment of FIG. 3 is very similar to that of FIG. 2 except that a single timing recovery circuit is provided for each channel instead of both a low Q timing recovery circuit and a high Q timing recovery circuit. In FIG. 3 compromise Q timing recovery circuits 37'' and 41'' are provided with each of the channels respectively in order to provide the desired timing recovery. In utilizing a compromise Q timing recovery circuit, the sensitivity and performance of this system is somewhat diminished but permits the system to be constructed with fewer components thereby reducing the overall cost of the system. For many applications, the sensitivity and performance provided by the embodiment of FIG. 3 may be adequate. Except for the provision of a single timing recovery circuit, the operation of FIG. 3 is exactly the same as the operation of the system shown in FIG. 2.

Although the embodiments of the present invention shown in FIGS. 1–3 have been two channel systems, the principle of operation of the present invention would also be applicable to a four channel system. Such a system would merely require the necessary Q timing recovery circuits, regenerators and input signals in order to make up a quadruple diversity reception system.

It should be understood, of course that the foregoing disclosure relates to only preferred embodiments of the invention and that numerous modifications or alterations may be made therein without departing from the spirit and the scope of the invention as set forth in the appended claims.

What is claimed is:

1. A digital diversity reception system comprising:

a plurality of informational signal channels, each connected to a separate source and each having a separate output for supplying digital pulses;

means for deriving a control signal from each of said outputs which varies as an inverse function of the variation in the time intervals between said digital pulses;

means fed by each of said means for deriving a control signal for producing a resultant control signal indicative of that channel having the least variation in said time intervals; and channel selecting means controlled by said resultant control signal for coupling one of the other of said channels to a digital signal output path of said system.

2. A system according to claim 1 wherein each of said means for deriving a control signal includes a filter having a lower band pass than said digital signal output path.

3. A system according to claim 2 wherein each of said separate outputs for supplying digital pulses feeds a pulse regenerator.

4. A system according to claim 3 wherein each of said regenerators is supplied with pulses from high Q filter or phase locked oscillator controlled by a signal derived from the signal input to said regenerator.

5. A system according to claim 1 wherein each of said digital pulse outputs supplies a separate pulse regenerator which is supplied with pulses from a source controlled by a signal derived from the input of said regenerator.

References Cited

UNITED STATES PATENTS

| | | | |
|---|---|---|---|
| 3,085,200 | 4/1963 | Goodall | 325—13 |
| 3,118,111 | 1/1964 | Miller | 325—3 |
| 3,213,370 | 10/1965 | Featherston | 325—304 |

RICHARD MURRAY, Primary Examiner

A. J. MAYER, Assistant Examiner

U.S. Cl. X.R.

178—69.5; 325—301, 302, 304